(12) United States Patent
Amirzadeh (10) Patent No.: US 10,851,018 B2
(45) Date of Patent: Dec. 1, 2020

(54) REINFORCED LIGHTWEIGHT AGGREGATES

(71) Applicant: Ali Amirzadeh, Tehran (IR)

(72) Inventor: Ali Amirzadeh, Tehran (IR)

(*) Notice: Subject to any disclaimer, the term of this patent is extended or adjusted under 35 U.S.C. 154(b) by 5 days.

(21) Appl. No.: 15/484,313

(22) Filed: Apr. 11, 2017

(65) Prior Publication Data

US 2017/0217836 A1 Aug. 3, 2017

Related U.S. Application Data

(60) Provisional application No. 62/330,092, filed on Apr. 30, 2016.

(51) Int. Cl.
| | | |
|---|---|---|
| *B01J 20/26* | (2006.01) | |
| *B01J 20/28* | (2006.01) | |
| *B01J 20/30* | (2006.01) | |
| *C04B 16/08* | (2006.01) | |
| *C04B 18/02* | (2006.01) | |
| *C04B 20/00* | (2006.01) | |
| *C08J 9/33* | (2006.01) | |
| *C08J 9/35* | (2006.01) | |

(52) U.S. Cl.
CPC .......... *C04B 18/027* (2013.01); *C04B 18/021* (2013.01); *C04B 20/002* (2013.01); *C04B 16/082* (2013.01); *C04B 16/087* (2013.01); *C08J 9/33* (2013.01); *C08J 9/35* (2013.01)

(58) Field of Classification Search
CPC ..... C04B 16/08; C04B 16/082; C04B 16/087; C04B 18/021; C04B 18/027; C04B 20/002; C08J 9/33; C08J 9/35
See application file for complete search history.

(56) References Cited

U.S. PATENT DOCUMENTS

| | | | |
|---|---|---|---|
| 6,488,766 B2 | 12/2002 | Balkum | |
| 6,669,773 B2 | 12/2003 | Malloy et al. | |
| 7,644,548 B2 * | 1/2010 | Guevara | C04B 16/08 106/705 |
| 9,840,851 B2 * | 12/2017 | Propst | B32B 5/26 |
| 2003/0109592 A1 * | 6/2003 | Shulman | C04B 18/021 521/54 |
| 2006/0201090 A1 * | 9/2006 | Guevara | C04B 16/08 52/309.12 |
| 2009/0014680 A1 * | 1/2009 | Kedacic | C04B 28/02 252/62 |
| 2012/0267562 A1 * | 10/2012 | Thichy | C04B 28/02 252/62 |
| 2013/0139727 A1 * | 6/2013 | Constantz | C04B 11/00 106/656 |
| 2013/0344303 A1 * | 12/2013 | Randall | A47B 85/06 428/201 |

FOREIGN PATENT DOCUMENTS

| | | |
|---|---|---|
| AT | 392962 B | 7/1991 |
| EP | 1598164 B9 | 7/2008 |
| JP | 25612099 A | 2/2001 |

* cited by examiner

*Primary Examiner* — Melissa A Rioja
(74) *Attorney, Agent, or Firm* — Bajwa IP Law Firm; Haris Zaheer Bajwa (57) ABSTRACT

An aggregate includes a polymeric foam present in a range of about 80 vol % to about 85 vol % of the aggregate. A cementitious matrix is present in a range of about 10 vol % to about 13 vol % of the aggregate. One or more resins are present in an amount of less than about 2 vol % of the aggregate, and one or more reinforcing fibers are present in an amount of less than about 1 vol % of the aggregate.

13 Claims, 6 Drawing Sheets

REINFORCED LIGHTWEIGHT AGGREGATES

CROSS REFERENCE TO RELATED APPLICATION

The present application claims priority from U.S. Provisional Patent Application Ser. No. 62/330,092, filed Apr. 30, 2016, entitled "Green Armed Lightweight Aggregates", which is incorporated by reference herein in its entirety.

TECHNICAL FIELD

The present application generally relates to lightweight aggregates, and more particularly to a reinforced lightweight aggregate and also a method for producing the same.

BACKGROUND

For a long time, natural aggregates such as mineral and river sands were used for producing most of the concrete, mortar and infrastructure of roads and buildings. Advances in concrete technology, the increasing need for lighter and more resistant materials, and the need for compliance with international obligations have led to the emergence of a new category of industrial aggregates known as lightweight aggregates. Utilizing the lightweight aggregates may lead to a reduction in the dead load of buildings and other construction projects.

Despite all efforts to develop lightweight aggregates capable of being used in a wide range of applications, specifically in concrete compositions, there are still some major drawbacks involved in developing and utilizing lightweight aggregates. There are some environmental considerations that should be regarded in new generations of such aggregates, including: excessive harvesting of minerals as raw materials; consumption of fossil and other fuels at high temperatures during the production methods (e.g., extrusion process); causing pollution during mining and production of raw materials and final product; using nearly 80% of valuable mineral raw materials (e.g., clay perlite, volcanic ash, etc.); and using heavy polymeric materials for producing lightweight aggregates.

Moreover, there are some technical and administrative considerations that must be taken into account while using these lightweight aggregates. These considerations include: high specific gravity and bulk density of the lightweight aggregates; higher price of the product and technology; lack of necessary and adequate raw materials, particularly minerals in all regions of the world; failure to meet the technical quality for using in wet areas and specifically water environments because of relatively high water absorption content of the lightweight aggregates; incompatibility with most adhesives, mortars and advanced materials; lack of capability to be used as an independent and resistant structural element in structural concrete; lack of diversity; staining; and low mechanical reinforcing properties.

Hence, there is a need for lightweight aggregates that include environmentally friendly raw materials, such as waste materials. There is further a need in the art for lightweight aggregates with adequate mechanical resistance and reinforcement, low specific weight, adequate water absorption contents according to end-user applications, etc. Moreover, there is a need in the art for a low energy consuming method to produce lightweight aggregates.

SUMMARY

In one general aspect of the present disclosure, an aggregate is disclosed. The aggregate may include: a polymeric foam present in a range of about 80 vol % to about 85 vol % of the aggregate; a cementitious matrix present in a range of about 10 vol % to about 13 vol % of the aggregate; and one or more reinforcing fibers present in an amount of less than about 1 vol % of the aggregate.

The above general aspect may include one or more of the following features. In some implementations, the aggregate may further have a water content of less than about 5 vol % of the aggregate. In certain cases, the aggregate may have an average particle size in a range of about 10 μm to about 100 mm. The aggregate may have a density in a range of about 350 kg/m$^3$ to about 1200 kg/m$^3$ in some examples.

In one implementation, the polymeric foam may include recycled or non-recycled polymeric foams, for example, waste polymeric foams, thermoplastic foams, thermoset foams, elastomeric foams, or combinations thereof.

In one implementation, the cementitious matrix may include Portland cement, a cementitious additive, and a coloring agent. The cementitious additive may be, for example, microsilica, nanosilica, fumed silica, or a combination thereof.

In another implementation, the reinforcing fibers may include polymeric or metallic fibers and in specific examples, the aggregate may include polypropylene fibers, glass fibers, carbon fibers, acrylic fibers, polyethylene fibers, polyvinyl alcohol fibers, nanocarbon fibers, polyester fibers, aramid fibers or stainless steel fibers.

In some implementations, the aggregate may include one or more resins present in an amount of less than about 2 vol % of the aggregate. The resins may include water-based resins, such as, for example, acrylic resins, acrylic vinyl acetate resins, acrylic styrene resins, polyurethane resins, epoxy resins or styrene maleic resins.

In different example implementations, the aggregate may be applicable in structural or non-structural concrete compositions, agricultural biological media or water absorption applications. Accordingly, the aggregate may be heat-resistant against a heating condition at about 1000° C. for a time interval of about 3 hours in certain examples.

In one implementation, the aggregate may be configured to be used in structural or non-structural concretes, and it may have a water absorption amount less than about 2% after a time interval of about 2 hours.

In another implementation, the aggregate may be configured for use in agricultural biological media or water absorption applications, and it may have a water absorption amount more than about 24% after a time interval of about 2 hours.

In another general aspect of the present disclosure, a method for manufacturing an aggregate is described. The method may include the steps of pre-treating a polymeric foam to obtain clean foam; grinding the clean foam into a plurality of foam granules; and mixing the foam granules with a mortar including one or more reinforcing fibers, forming the aggregate.

In one implementation, the pre-treatment of the polymeric foam may include washing, disinfecting and drying the polymeric foam to obtain the clean foam.

In some implementations, the clean foam may be ground, for example, in a mill. In certain cases, the foam granules may have an average size of about 2 mm or less.

In some implementations, the mortar may be produced by a process that includes dry mixing a cementitious matrix with the one or more reinforcing fibers to form a dry mixture; and mixing the dry mixture with water and at least one resin.

In some implementations, the foam granules and the mortar may be mixed in a mixer, such as, for example, a centrifuge. In certain cases, the mixing may include rotating the mixer at a first speed for a first interval and adding the mortar into the mixer while rotating the mixer at a second speed for a second time interval. The second speed may be higher than the first speed. In an example, the first speed may be about 1 revolution/second or less, and the first time interval may be about one minute. In some cases, the mortar may be added into the mixer by a spraying process. In some implementations, the second speed may be about 2 revolutions/second, and the second time interval may be about 20 minutes or more.

DETAILED DESCRIPTION

The following detailed description is presented to enable a person skilled in the art to make and use the example products and methods of the present disclosure. For purposes of explanation, specific nomenclature is set forth to provide a thorough understanding of the present disclosure. However, it will be apparent to one skilled in the art that these specific details are not required to practice the disclosed examples. Descriptions of specific applications are provided only as representative examples. Various modifications to the sample implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure describes a reinforced lightweight aggregate and a method for manufacturing the same. In order to overcome the problems and disadvantages of available lightweight aggregates some solutions are described in this disclosure for producing industrial lightweight aggregates. These solutions can include, but not limited to using recycled waste materials, for example, recycled polymeric foams as raw materials, reducing the consumption of minerals as the main elements of the environment, using a dry environmentally friendly method without heating and using fossil fuels to produce such lightweight aggregates, using polymeric and metallic fibers for reinforcement and increasing mechanical and technical strength of the aggregates, a simple and dry process for recycling waste materials and production of reinforced lightweight aggregate that may be carried out in a fixed or mobile production system and fabricating the reinforced lightweight aggregates in accordance with national and international requirements.

As used herein, the term "reinforced" refers to the improved mechanical and physical properties of the disclosed lightweight aggregates in the present disclosure that caused by using reinforcing fibers, the formulation of the present lightweight aggregates and raw materials that have been used here.

As used herein, the term "armed" refers to the use of reinforcing fibers in a mortar composition, which is used in the present disclosed method of manufacturing reinforced lightweight aggregates and giving the improved mechanical and physical properties to the lightweight aggregates, pursuant to the teachings of the present disclosure.

In an aspect of the present disclosure, a reinforced lightweight aggregate is described. The reinforced lightweight aggregate may include at least one polymeric foam, a cementitious matrix, and one or more reinforcing fibers. In certain cases, the aggregate may further include water. Moreover, in some examples, the aggregate may further include one or more resins. In certain examples, the reinforced lightweight aggregates may have a density in a range of about 350 kg/m$^3$ to about 1200 kg/m$^3$.

Figure 1:
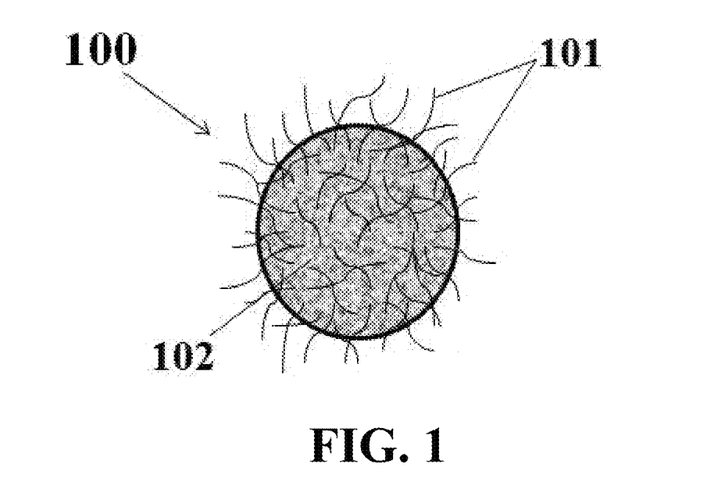
FIG. 1 illustrates a schematic of an example of a reinforced lightweight aggregate, consistent with one or more examples of the present disclosure.

FIG. 1 shows a schematic of an example reinforced lightweight aggregate 100 representing a general shape and structure of an example of the aggregates of the present disclosure. According to the example illustrated in this figure, reinforcing fibers 101 may be present as the agents, particularly for providing and improving mechanical specifications within a sticky body 102 that may include polymeric foams, cementitious matrix, resins and, in certain cases, water.

Figure 2A:
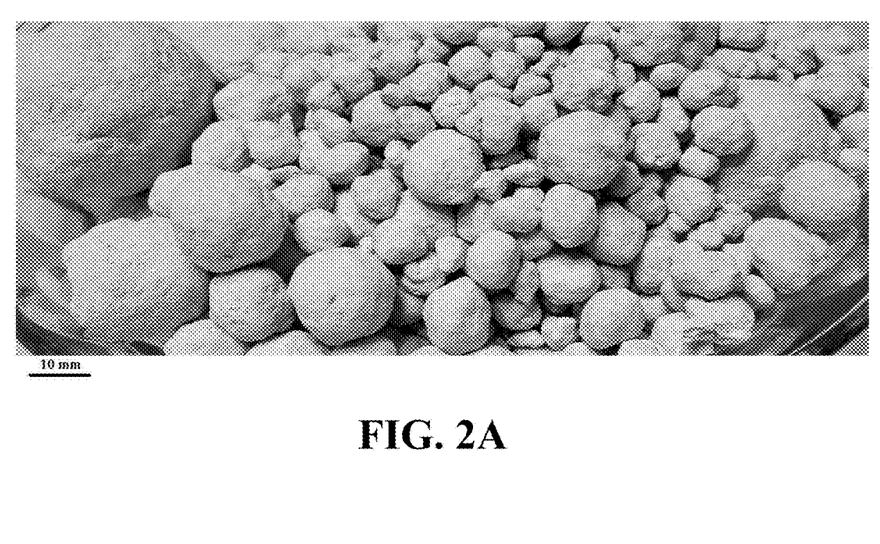
FIG. 2A illustrates a photograph of an example of the reinforced lightweight aggregate reinforced by polymeric fibers, consistent with one or more examples of the present disclosure.
Figure 2B:
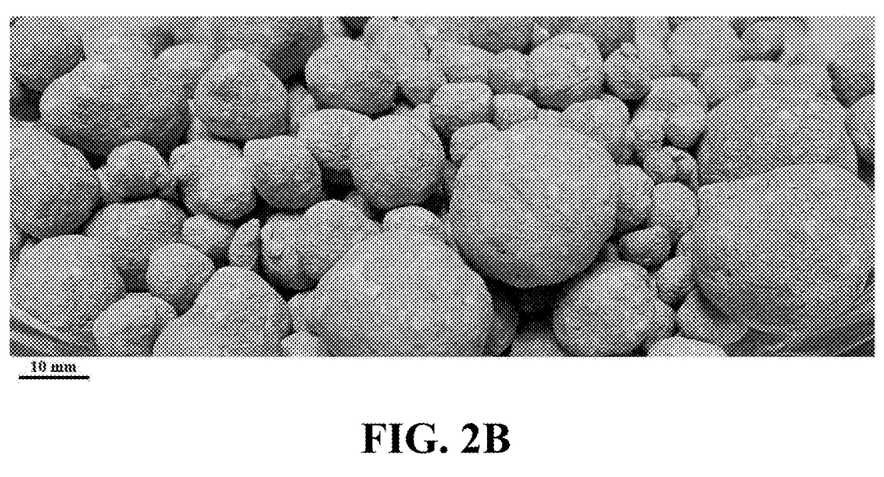
FIG. 2B illustrates a photograph of an example of the reinforced lightweight aggregate reinforced by metallic fibers, consistent with one or more examples of the present disclosure.
Figure 2C:
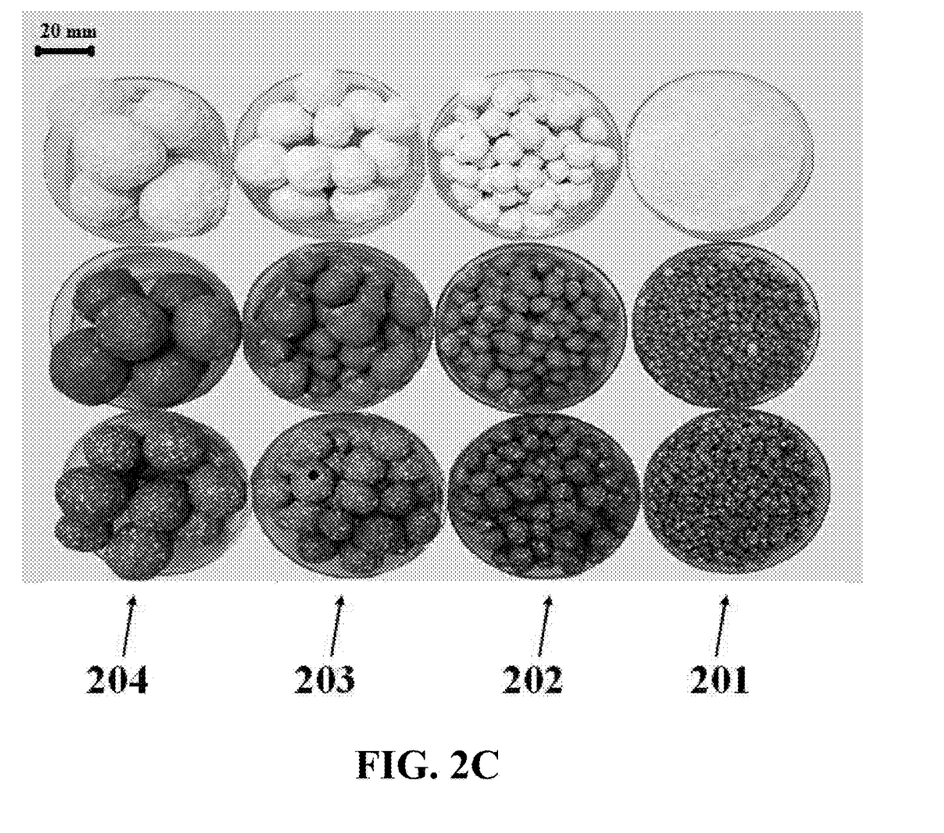
FIG. 2C illustrates a photograph of examples of reinforced lightweight aggregates in four different size ranges, consistent with one or more examples of the present disclosure

FIGS. 2A, 2B and 2C are photographs of examples of reinforced lightweight aggregates of the present disclosure. In certain cases, the aggregates may have a sand-like shape. Different examples of the reinforced lightweight aggregates may have different shapes (e.g., rounded corners, or sharp corners). Referring to FIG. 2C, the reinforced lightweight aggregates of the present disclosure may have different particle sizes ranging from about 10 μm to about 100 mm. For instance, the sample aggregates shown in FIG. 2C may have an average particle size less than about 4 mm for reinforced lightweight aggregates labeled as 201, between about 4 mm and 8 mm for reinforced lightweight aggregates labeled as 202, between about 8 mm and 14 mm for reinforced lightweight aggregates labeled as 203 and between about 14 mm and 50 mm for reinforced lightweight aggregates labeled as 204.

In some implementations, the polymeric foam may be present in the reinforced lightweight aggregate formulation in an amount of about 80 vol % to about 85 vol % based on the total volume of the reinforced lightweight aggregate. In some examples, the polymeric foam may include recycled or non-recycled waste polymeric foams that, in certain cases, may be ultra-lightweight materials and may be selected from the group consisting of thermoplastic foams, thermoset foams, elastomeric foams, or combinations thereof.

The cementitious matrix may be present in the reinforced lightweight aggregate formulation as a sticky component in an amount of about 10 vol % to about 13 vol % based on the total volume of the reinforced lightweight aggregate. In some examples, the cementitious matrix may include Portland cement, cementitious additives and coloring agents.

The cementitious additives may be selected from the group consisting of microsilica, nanosilica, fumed silica, or their combinations. The coloring agents may be cement coloring agents that cause the reinforced lightweight aggregates to be white or colored.

Furthermore, in some examples, one or more resins may be present in the reinforced lightweight aggregate formulation in an amount of less than about 2 vol % based on the total volume of the reinforced lightweight aggregate. In some examples, the resins may include water-based resins that may be selected from the group consisting of acrylic resins, acrylic vinyl acetate resins, acrylic Styrene resins, polyurethane resins, epoxy resins, styrene maleic resins, and combinations thereof. However, some examples of the reinforced lightweight aggregate may include no resins.

In addition, the reinforced lightweight aggregate of the present disclosure may include at least one reinforcing fiber with an amount of about 1 vol % or less based on the total volume of the reinforced lightweight aggregate. The reinforcing fibers may include polymeric or metallic fibers that may be selected from the group consisting of polypropylene fibers, glass fibers, carbon fibers, acrylic fibers, polyethylene fibers, polyvinyl alcohol fibers, nanocarbon fibers, polyester fibers, aramid fibers, stainless steel fibers, and combinations thereof. Referring again to FIGS. 2A and 2B, examples of reinforced lightweight aggregates including polymeric reinforcing fibers (i.e. polypropylene fibers) are shown in FIG. 2A and examples reinforced lightweight aggregates including metallic reinforcing fibers are shown in FIG. 2B.

In some implementations, the reinforced lightweight aggregate may further include a water content less than about 5 vol % based on the total volume of the reinforced lightweight aggregate.

In certain examples, the reinforced lightweight aggregates of the present disclosure may have heat-resistant properties and may endure a heating condition with a temperature of about 1000° C. for a time interval of about 3 hours.

Implementations of the reinforced lightweight aggregates of the present disclosure may be used in a variety of applications, for example, in concrete compositions, either structural or non-structural concretes, strong explosion-proof concretes, roads, buildings or construction industry, lightweight construction mortars, insulators, absorption of chemicals and petroleum, and agricultural biological media or water absorption applications.

Based on the specific application, the formulation of the reinforced lightweight aggregate including the raw materials and their amounts and consequently resulted specifications and characteristics of the reinforced lightweight aggregate may be varied and modified. For example, a reinforced lightweight aggregate for use in concretes composition may include about 85 vol % of polymeric foams, about 13 vol % of cementitious matrix, about 1 vol % of resins and about 1 vol % of reinforcing fibers. Accordingly, the obtained reinforced lightweight aggregate may be appropriate to use in structural or non-structural concretes having a water absorption amount of less than about 2% after a time interval of about 2 hours.

In another example, a reinforced lightweight aggregate for use in agricultural biological media or water absorption applications may include about 86% of polymeric foams, about 13% of cementitious matrix and about 1% of reinforcing fibers. Accordingly, the obtained reinforced lightweight aggregate may be appropriate to use in agricultural biological media or water absorbents materials having a water absorption amount more than about 24% after a time interval of about 2 hours.

In another aspect of the present disclosure, a method is described to manufacture aggregates, particularly, reinforced lightweight aggregates, including: pre-treating at least one polymeric foam to obtain clean foam, grinding the clean foam into a plurality of foam granules and mixing the foam granules with a mortar including one or more reinforcing fibers ("armed mortar") forming the reinforced lightweight aggregate.

Figure 3A:
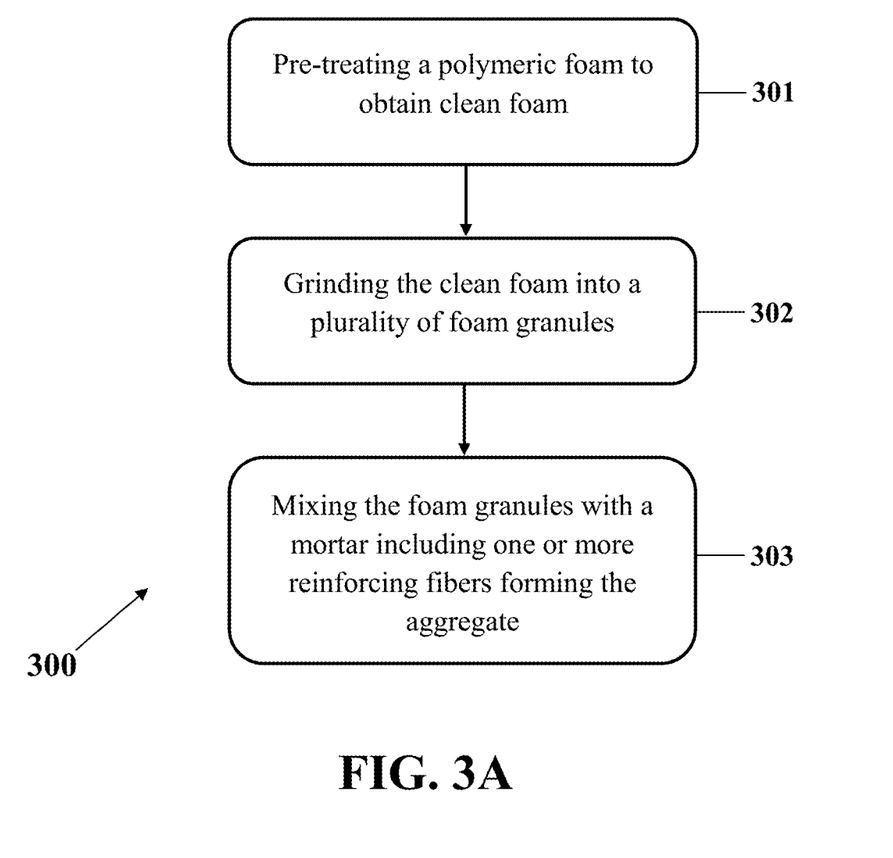
FIG. 3A illustrates an example manufacturing method for reinforced lightweight aggregate, consistent with one or more aspects the present disclosure.

FIG. 3A illustrates an example of a method 300 for manufacturing an aggregate according to an aspect of the present disclosure. Operations according to the method 300 may include: pre-treating the polymeric foam to obtain clean foam (step 301), grinding the clean foam into the plurality of foam granules (302) and mixing the foam granules with the armed mortar forming the aggregate (303). In many cases, the aggregate manufactured by this method may be a reinforced lightweight aggregate.

Referring to step 301, in one implementation, at least one polymeric foam may be cleaned through washing, disinfecting and drying processes to obtain clean polymeric foam.

In some implementations, the polymeric foam that may be a recycled or non-recycled polymeric foam may be washed and disinfected, for example in a basin, and then may be taken to a drying room. The polymeric foam may form about 80% to about 85% of the total volume of a sample obtained aggregate at the end of method 300.

Moving on to step 302, the clean foam may be grinded to obtain foam granules. The grinding may be carried out in a grinding device such as a grinder or a mill, and the obtained foam granules may have an average particle size of about 2 mm or less.

Moving on to step 303, the foam granules formed through step 302 may be mixed with the armed mortar to obtain the aggregate, which in many cases may be a reinforced lightweight aggregate. In some cases, the foam granules and the armed mortar may be mixed by subjecting the foam granules to a mixing process in a mixer and rotating the mixer at a first speed for a first time interval while the foam granules are in the mixer and adding the armed mortar into the mixer while rotating at a second speed for a second time interval to form the aggregate. The second speed may be higher than the first speed. In some examples, the first speed may be a low speed, and the second speed may be a high speed. The first and second time interval may be a specific time intervals in certain implementations. In some cases, the mortar may not be in the mixer during the first time interval.

In some implementations, the mixer may include a centrifuge. In an example, the foam granules may be transferred into the mixer during the first time interval. In certain cases, the first speed may be about 1 revolution/second or less. In some examples, the first time interval may be about 1 minute. The mortar may be added into the mixer after the first time interval in certain examples. The armed mortar may be added into the mixer, for example by a spraying process. In some cases, the mixer may be rotated at a speed of about 2 revolution/second, and in certain examples the second time interval may be about 20 minutes or more to form the reinforced lightweight aggregate. In certain implementations, the second time interval may be about 25 minutes.

Figure 3B:
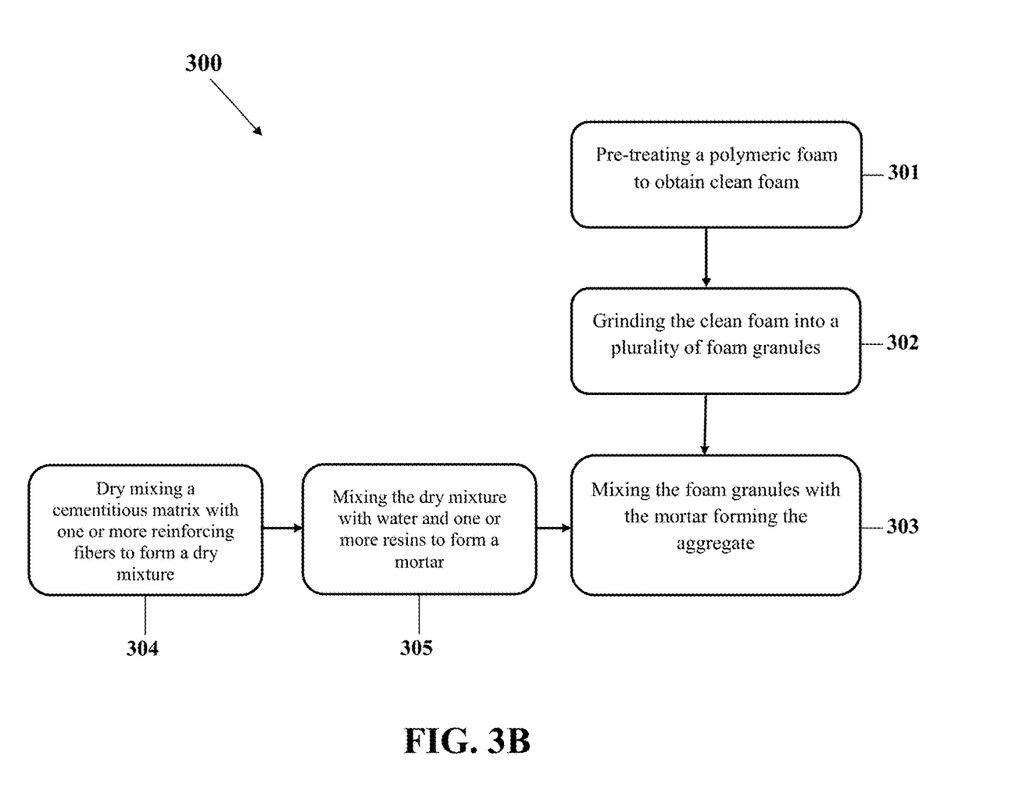
FIG. 3B illustrates a more detailed example manufacturing method for the reinforced lightweight aggregate, consistent with one or more aspects of the present disclosure.

FIG. 3B illustrates a more detailed example manufacturing method than the method shown in FIG. 3A. In some implementations, the armed mortar may be produced in a process including steps 304 and 305 in FIG. 3B and then may be mixed with the foam granules in step 303. In certain cases, the process may be a two-step process.

Referring to FIG. 3B, in certain implementations of method 300, an armed mortar may be produced through a process including dry-mixing of a cementitious matrix with one or more reinforcing fibers to form a dry mixture (step 304) and mixing the obtained dry mixture with water and one or more resins to form the armed mortar (step 305). Thus, in some cases, the cementitious matrix, reinforcing fibers, water and resins may be present in the obtained reinforced lightweight aggregate, which may be produced by an example of the present method, as described in more detail hereinabove.

As described above, in some implementations the cementitious matrix may include Portland cement, one or more cementitious additives and coloring agents. In certain applications, the cementitious additives may include microsilica, nanosilica, fumed silica, or combinations thereof.

In some implementations, after completion of the manufacturing method 300, which may take less than 4 hours in total, the produced reinforced lightweight aggregate may be transferred to a maintenance room with a humidity of more than about 70% and may be kept there at least for about 48 hours. Then, a screening process may be done to separate produced reinforced lightweight aggregates through method 300 in various size ranges to be used appropriately to the end user applications. In certain examples, the difference in particle size between the smallest and largest particles of the produced reinforced lightweight aggregate may be less than about 100 mm.

EXAMPLES

Example 1: Specifications of Reinforced Lightweight Aggregates

In this example, four examples of the reinforced lightweight aggregate of the present disclosure labeled as A, B, C and D according to a wide variety applications of the reinforced lightweight aggregates were manufactured.

Table 1 represents technical and mechanical characteristics of four types of the reinforced lightweight aggregate (A, B, C and D) produced according to the formulation and manufacturing method of the present disclosure. As reported in this table, type A is an example of reinforced lightweight aggregate appropriate for use in non-structural concrete uses, which is ultra-lightweight having a bulk density between about 400 Kg/m$^3$ and about 500 Kg/m$^3$, having a compressive (mechanical) strength of about 52%, and with a water absorption of less than about 4%. Type B may be appropriate for use in semi-structural uses, as it has a lower water absorption of less than about 2% and also a greater mechanical strength of about 58%. As shown in this table, type C may be an example reinforced lightweight aggregate for use in structural applications, as it has greater mechanical strength of about 68% and less thermal conductivity. There is also an example reinforced lightweight aggregate labeled as D with a low thermal conductivity and water absorption and an even greater mechanical strength of about 78% while keeping lightweight characteristics (density between 900 Kg/m$^3$-1200 Kg/m$^3$). It should be noted that water absorption amounts may be determined based on ASTM C128-C70.

TABLE 1

Technical and mechanical characteristics of different examples of the reinforced lightweight aggregate

| Reinforced lightweight aggregate | Porosity (%) | Thermal conductivity (W/m · k) | Thermal resistance class | Water absorption (%) | Compressive strength (%) | Bulk density (Kg/m$^3$) |
|---|---|---|---|---|---|---|
| A: Non-Structural | 75 | 0.1 | A | <4 | 52 | 400-500 |
| B: Semi-structural | 72 | 0.1 | A | <2 | 58 | 500-750 |
| C: Structural | 70 | 0.05 | A | <2 | 68 | 750-900 |
| D: Special | 68 | 0.05 | A | <1 | 78 | 900-1200 |

Example 2: The Use of Reinforced Lightweight Aggregate in Concretes

As described above, the reinforced lightweight aggregates produced pursuant to the teachings of the present disclosure may be used as a main component of a concrete composition. In this example, two sample concrete compositions labeled as C250 and C350 including the reinforced lightweight aggregates of the present disclosure were produced.

The specifications of C250 and C350 are shown in Table 2. As reported in Table 2, C250 is a non-structural concrete that may be applicable in non-structural applications, such as concrete products, wall structure, ceiling, flooring, insulation, etc. C350 is a structural concrete that may be applicable in structural applications such as concrete products, wall, ceiling, flooring, road construction, pavement, etc. It should be noted that water absorption amounts may be determined based on ASTM C128-C70.

TABLE 2

| | Technical and mechanical characteristics of concretes including the reinforced lightweight aggregate | | | | | |
|---|---|---|---|---|---|---|
| Concrete | Specific gravity (Kg/m³) | Compressive strength (MPa) | Water absorption (%) | Flexural strength (MPa) | Thermal conductivity (W/m · k) | Thermal resistance class |
| C250 (non-structural) | 780 | 3.2 | <12 | 2.8 | 0.1 | A |
| C350 (structural) | 1400 | 32 | <10 | 28 | 0.1 | A |

What is claimed is:

1. An aggregate comprising:
   a polymeric foam present in a range of 80 vol % to 85 vol % of the aggregate, the polymeric foam comprising at least one of waste polymeric foams, thermoset foams, elastomeric foams, and combinations thereof;
   a cementitious matrix present in a range of about 10 vol % to 13 vol % of the aggregate;
   one or more reinforcing fibers present in an amount of less than 1 vol % of the aggregate; and
   one or more water-based resins present in an amount of less than 2 vol % of the aggregate, the one or more water-based resins comprising at least one of polyurethane resins, epoxy resins, styrene maleic resins, and combinations thereof,
   wherein the aggregate has a density in a range of 350 kg/m³ to 550 kg/m³.

2. The aggregate according to claim 1, wherein the aggregate has a water content of less than 5 vol % of the aggregate.

3. The aggregate according to claim 1, wherein the aggregate has an average particle size in a range of greater than 100 μm to 100 mm.

4. The aggregate according to claim 1, wherein the polymeric foam comprises a recycled waste polymeric foam.

5. The aggregate according to claim 1, wherein the cementitious matrix comprises Portland cement, a cementitious additive, and a coloring agent.

6. The aggregate according to claim 5, wherein the cementitious additive comprises at least one of microsilica, nanosilica, fumed silica, and combinations thereof.

7. The aggregate according to claim 1, wherein the one or more reinforcing fibers comprise one or more polymeric fibers, one or more metallic fibers, one or more glass fibers, or a combination thereof.

8. The aggregate according to claim 1, wherein the aggregate is heat-resistant against a heating condition of about 1000° C. for a time interval of 3 hours.

9. The aggregate according to claim 1, wherein the aggregate is configured to use in structural or non-structural concretes and has a water absorption amount less than 2% after a time interval of 2 hours.

10. The aggregate according to claim 1, wherein the aggregate is configured to use in agricultural biological media or water absorption applications and has a water absorption amount more than 24% after a time interval of 2 hours.

11. An aggregate comprising:
    a recycled waste polymeric foam comprising at least one of thermoset foams, elastomeric foams, and combinations thereof, the recycled waste polymeric foam present in a range of 80 vol % to 85 vol % of the aggregate;
    a cementitious matrix present in a range of 10 vol % to 13 vol % of the aggregate, the cementitious matrix comprising:
    Portland cement;
    a cementitious additive; and
    a coloring agent;
    one or more reinforcing fibers present in an amount of less than about 1 vol % of the aggregate, the one or more reinforcing fibers comprising at least one metallic fiber; and
    one or more water-based resins present in an amount of less than about 2 vol % of the aggregate, the one or more water-based resins comprising at least one of polyurethane resins, epoxy resins, styrene maleic resins, and combinations thereof,
    wherein the aggregate has a density in a range of 350 kg/m³ to about 550 kg/m³.

12. The aggregate according to claim 11, wherein the aggregate has a water content of less than 5 vol % of the aggregate.

13. The aggregate according to claim 11, wherein the aggregate has an average particle size in a range of 100 μm to 100 mm.

* * * * *